May 12, 1925.                               1,537,726
M. ALMA
BUFFING AND DRAW GEAR FOR RAILWAY VEHICLES
Filed July 13, 1922
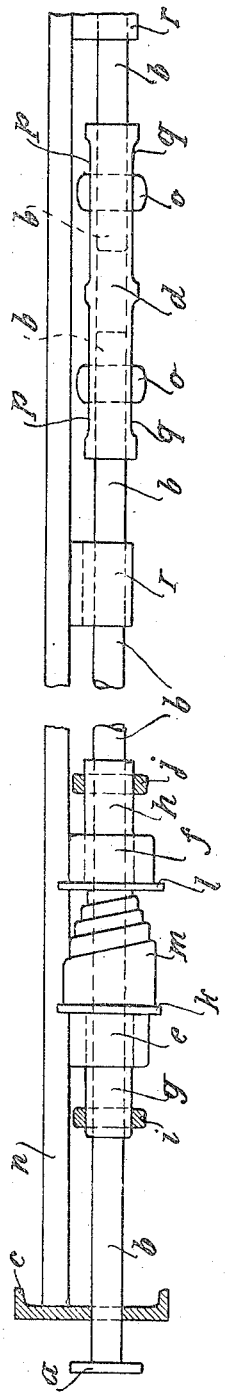
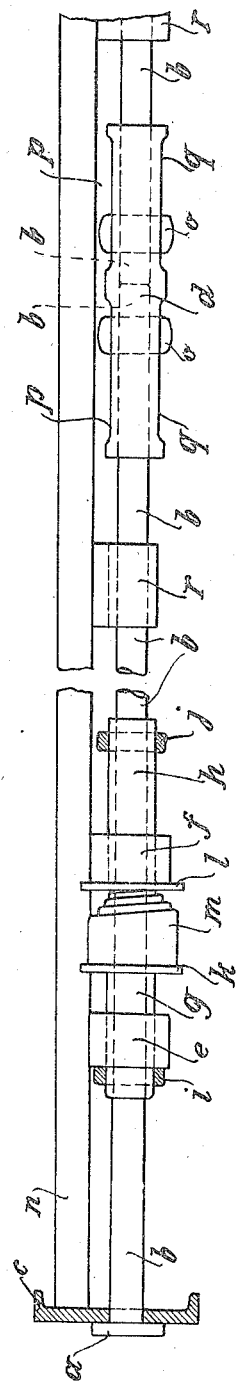
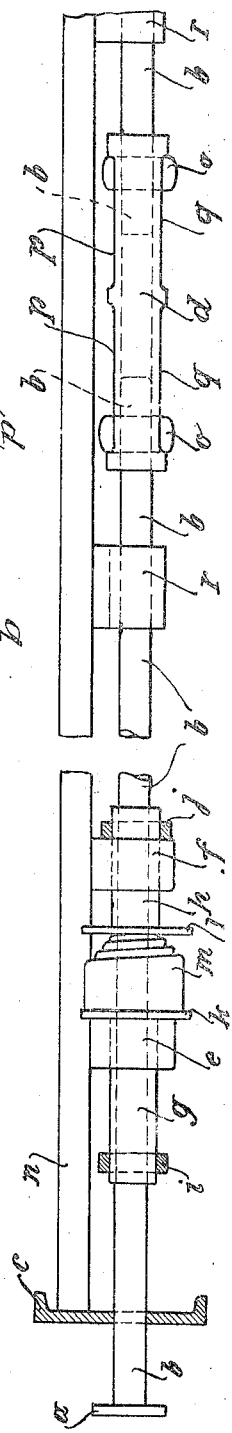
Inventor
Maximilian Alma Patented May 12, 1925.

1,537,726

UNITED STATES PATENT OFFICE.

MAXIMILIAN ALMA, OF VIENNA, AUSTRIA.

BUFFING AND DRAW GEAR FOR RAILWAY VEHICLES.

Application filed July 13, 1922. Serial No. 574,777.

*To all whom it may concern:*

Be it known that I, Dr. MAXIMILIAN ALMA, a citizen of the Republic of Austria, and residing at Vienna, Austria, have invented certain new and useful Improvements in a Buffing and Draw Gear for Railway Vehicles, of which the following is a specification.

This invention has reference to buffing and draw gear for railway vehicles and the like and has for its object to provide an improved yielding continuous buffing and draw device comprising a draw rod in two parts that are displaceably connected at the centre of the vehicle and subjected to the influence of springs.

According to the invention the springs are so disposed, between sleeves mounted to slide in fixed bearings and connected with the draw-rod, that the said springs will press against the bearings in the case of stresses due not only to draw or tractive efforts but also to buffing or compressing thrusts.

In the drawing, Fig. 1 is a sectional elevation of approximately one-half of a device illustrating my present invention. In this figure the parts are shown in their normal position of rest.

Fig. 2 is a similar view showing the position of parts when a buffing thrust is applied thereto, and Fig. 3 is also a similar view in which the position which the parts assume when a tractive thrust is applied thereto is shown.

And Fig. 4 is a partial plan showing the inner ends of the draft and buffer rods and the sleeve in which they are slidably mounted.

The part $a$ diagrammatically indicates an automatic coupling head or the part for connection therewith in a vehicle. From this part the half $b$ of the draw rod extends through the headstock or buffer beam $c$ and the other transverse members of the undertrame up to the centre of the vehicle, where it is longitudinally movable in the connecting member $d$ which is adapted to slide to a limited extent. The longitudinal displaceability of the rod $b$ in the connecting member is limited by means of a cotter $o$ fixed to the rod and sliding in longitudinal slots $p$, $q$ of the part $d$. The other half of the draw rod, the inner end of which is shown in part at the right of the drawing, possesses the same symmetrical arrangement. The part of the draw rod traversing the headstock or buffer beam has an angular cross section in order to prevent any twisting or turning of the rod. The remaining portion of the rod is or may be of round cross section.

As illustrated in the drawing, bearing members $e$ and $f$ are suitably secured to a central or longitudinal member $n$ forming part of the under frame or body of the vehicle. Journaled in these bearings $e$ and $f$ are tubular sleeves $g$ and $h$. The rod $b$ passes through the sleeves $g$ and $h$ and these sleeves are fixed in position on the rod by means of cotter pins $i$ and $j$ respectively or otherwise.

Bearing against the facing ends of the sleeves $g$ and $h$ are abutment plates $k$ and $l$ which are displaceable upon the draw rod and between which there is located a helical spring $m$. A bearing $r$, attached to the said central longitudinal member $n$, serves to guide the draw rod.

In the position of rest shown in Fig. 1 the abutment plates $k$ and $l$ are pressed by the spring $m$ not only against the bearings $e$ and $f$ but also against the sleeves $g$ and $h$ guided therein which is the normal position of the parts of the apparatus.

Upon the occurrence of a buffing push or inward thrust (Fig. 2) the rod $b$ is moved inwardly and by means of the sleeve $g$ the abutment plate $k$ is correspondingly moved so that the spring $m$ is compressed towards the abutment plate $l$ which at this time is held against movement by the fixed bearing $f$. The limitation of the displacement is effected by the impact of the cotter $i$ upon the bearing $e$ or by impact of the coupling head $a$ upon the headstock or buffer beam $c$ or both.

The dimensions of the sliding parts are preferably so selected that upon buffing thrusts occurring at both ends of the vehicle, that is to say upon simultaneous pressing in of both parts of the draw rod, the inner ends of said rod parts will strike together within the connecting member $d$ prior to the complete compression of the springs $m$.

Upon the occurrence of a pull or draw (Fig. 3) the draw rod will be pulled outwardly and, by means of the sleeve $h$, the abutment plate $l$ will be correspondingly moved with simultaneous compression of the spring $m$, towards the abutment plate $k$ which is at this time prevented from movement by the bearing $e$. The limitation of the movement is effected by the cotter *j* bearing against the bearing *f*. The amount which the draw rod parts can move apart from each other upon the occurrence of a draw or pull, is determined by the length of the slots *p*, *q* in the connecting member *d* and in which the draw rod cotters *o* are guided. This amount is preferably smaller than the sum total of the amounts of play of both springs *m*. With a slight degree of displaceability of the connecting member *d* (between two draw rod bearings) the limitation of the movement of a draw rod part is effected in any case by the cotter *o* the connecting member *d* being pressed against the corresponding bearing.

It will therefore be apparent that in the apparatus as hereinbefore described relatively slight tensile or compression strains are absorbed by the springs *m* and a portion of the same may be transmitted from one end of the vehicle to the other through the body or frame thereof, whereas strains of either nature when greater than a predetermined amount are transmitted directly through the bar or rod members *b*.

In case the two guide bearings *r* are arranged so close together that the displaceability of the connecting member *d* between them is only very slight, then the dimensions can be so selected that the limitation of the movement of a draw rod part *b* in a direction out of the vehicle—instead of being effected by the impact of the cotter *j* upon the bearing *f*—can be effected by the impact of the cotter *o* upon the end of the slot in the connecting member *d* the said connecting member *d* being pressed against the bearing *r*.

What I claim is:

1. In a vehicle and in combination with the frame thereof, draft and buffer rods in alignment and extending longitudinally of the frame of the vehicle, a sleeve in which the adjacent ends of the said draft and buffer rods are slidable, means for mounting the said draft and buffer rods on the frame of the vehicle, and means for yieldingly maintaining the said draft and buffer rods in an initial position in which the adjacent ends thereof are spaced within the said sleeve permitting the said rods to be moved toward and away from each other to a predetermined extent whereby buffer stresses applied substantially simultaneously to the outer portions of the said rods move the same toward each other to bring the inner ends of the said rods together, and draft stresses applied substantially simultaneously to the end portions of the said rods move the same apart connecting them to the said sleeve through which said stresses are then applied independently of the vehicle frame.

2. In a vehicle and in combination with the frame thereof, draft and buffer rods in alignment and extending longitudinally of the frame of the vehicle, bearings attached to the frame of the vehicle for each draft and buffer rod, cylindrical members movable in each bearing with a draft and buffer rod passing through the same, means for connecting each draft and buffer rod to the cylindrical members associated therewith, a yielding device associated with each draft and buffer rod and extending between the bearings in which the cylindrical members therefor are mounted, and a sleeve within which the inner adjacent ends of the draft and buffer rods are slidable toward and away from each other, the said yielding devices maintaining the said draft and buffer rods in positions in which their adjacent ends are spaced within the said sleeve whereby when buffer stresses of greater than a predetermined force are applied substantially simultaneously to the outer portions of the said rods the rods are moved toward each other until their inner adjacent ends contact when such buffer stresses are transmitted directly through the said rods and whereby when draft stresses greater than a predetermined force are applied to the outer portions of the said rods the same are moved apart a predetermined extent to connect with the said sleeve whereby through the sleeve the said stresses are transmitted directly from one bar to the other independently of the frame of the vehicle.

3. In a vehicle and in combination with the frame thereof, sets of bearings attached to the frame adjacent both ends thereof, a cylindrical member slidable in each bearing of both sets thereof, draft and buffer rods in alignment and extending through the said cylindrical members, means for connecting each draft and buffer rod with the cylindrical members through which it passes, a yielding device associated with each draft and buffer rod and located between the bearings for the cylindrical members through which each draft and buffer rod passes, a sleeve in which the inner or adjacent ends of the said draft and buffer rods are slidable toward and away from each other, and means for determining the extent to which the draft and buffer rods may be moved away from each other whereby when buffer stresses sufficient to overcome the action of the said yielding devices are applied substantially simultaneously to the opposite outer portions of the said draft and buffer rods these rods are moved toward each other to bring the inner ends into contact to transmit said stresses directly through the said rods and whereby when draft stresses of sufficient force to overcome the action of the said yielding devices are applied substantially simultaneously to the said rods the rods are moved apart to the extent permitted by the means for limiting the same to cause the said draft stresses to be transmitted directly from one rod to the other through the said sleeve.

4. In a vehicle and in combination with the frame thereof, sets of bearings attached to the frame adjacent both ends thereof, a cylindrical member slidable in each bearing of both sets thereof, draft and buffer rods in alignment and extending through the said cylindrical members, means for connecting each draft and buffer rod with the cylindrical members through which it passes, a spring associated with each draft and buffer rod and located between the bearings for the cylindrical members through which each draft and buffer rod passes, a sleeve in which the inner or adjacent ends of the said draft and buffer rods are slidable toward and away from each other, and means for determining the extent to which the draft and buffer rods may be moved away from each other whereby when buffer stresses sufficient to overcome the action of the said springs are applied substantially simultaneously to the opposite outer portions of the said draft and buffer rods these rods are moved toward each other to bring the inner ends into contact to transmit said stresses directly through the said rods and whereby when draft stresses of sufficient force to overcome the action of the said springs are applied substantially simultaneously to the said rods the rods are moved apart to the extent permitted by the means for limiting the same to cause the said draft stresses to be transmitted directly from one rod to the other through the said sleeve.

5. In a vehicle and in combination with the frame thereof, sets of bearings attached to the frame adjacent both ends thereof, a cylindrical member slidable in each bearing of both sets thereof, draft and buffer rods in alignment and extending through the said cylindrical members, means for connecting each draft and buffer rod with the cylindrical members through which it passes, a spring associated with each draft and buffer rod and located between the bearings for the cylindrical members through which each draft and buffer rod passes, a sleeve within which the inner ends of the said draft and buffer rods are slidable, the sleeve being provided with longitudinal slots, and pins passing through the inner ends of the said rods and moving in the said slots, the said springs normally maintaining the rods in the position in which the inner ends thereof are spaced within the said sleeve whereby when buffer stresses of greater than a predetermined force are applied substantially simultaneously to the outer portions of the said rods the rods are moved toward each other causing the ends thereof to come into contact whereby the said stresses are transmitted directly through the said rods and whereby when draft stresses of a greater than a predetermined force are applied substantially simultaneously to the said rods the same are moved apart bringing the said pins into contact with the extremities of the slots in the sleeve to cause the said stresses to be transmitted directly through the sleeve from one rod to another.

In testimony whereof I affix my signature in presence of two witnesses.

Dr. MAXIMILJAN ALMA

Witnesses:
 CARL COUNTENBURG,
 HEINRICH FLEISCHKOIST.